United States Patent
Kawai

(10) Patent No.: US 8,274,718 B2
(45) Date of Patent: Sep. 25, 2012

(54) METHOD FOR CREATING COLOR CONVERSION DEFINITION FOR IMAGE OUTPUT DEVICES AND IMAGE PROCESSING APPARATUS IMPLEMENTING THE METHOD

(75) Inventor: Yoshinori Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1027 days.

(21) Appl. No.: 12/052,824

(22) Filed: Mar. 21, 2008

(65) Prior Publication Data
US 2008/0239348 A1    Oct. 2, 2008

(30) Foreign Application Priority Data

Mar. 26, 2007   (JP) .................. 2007-079448

(51) Int. Cl.
*G03F 3/08* (2006.01)
*H04N 1/46* (2006.01)
*H04N 1/60* (2006.01)
*G06K 9/00* (2006.01)

(52) U.S. Cl. .......... 358/523; 358/509; 358/1.9; 382/167

(58) Field of Classification Search .................. 358/1.9, 358/509, 510, 516, 518, 523, 520, 524, 535, 358/1.16, 1.8; 382/167, 162
See application file for complete search history.

(56) References Cited

U.S. PATENT DOCUMENTS

| | | | |
|---|---|---|---|
| 6,373,531 B1 * | 4/2002 | Hidaka et al. ................. | 348/603 |
| 6,567,543 B1 * | 5/2003 | Shiraiwa et al. .............. | 382/167 |
| 7,027,067 B1 * | 4/2006 | Ohga ............................. | 345/589 |
| 7,053,910 B2   | 5/2006 | Newman ....................... | 345/604 |
| 7,158,144 B2 * | 1/2007 | Shiraiwa et al. .............. | 345/589 |
| 7,233,421 B2 * | 6/2007 | Silverbrook .................. | 358/509 |
| 7,265,781 B2 * | 9/2007 | Noguchi ...................... | 348/223.1 |
| 7,289,156 B2 * | 10/2007 | Silverbrook et al. ........ | 348/374 |
| 7,352,488 B2 * | 4/2008 | Ben-Chorin et al. ......... | 358/1.9 |

(Continued)

FOREIGN PATENT DOCUMENTS

JP    2002-168697 A    6/2002

(Continued)

OTHER PUBLICATIONS

Office Action issued on Sep. 2, 2011, in counterpart JPA 2007-079448.

*Primary Examiner* — Madelein A Nguyen
(74) *Attorney, Agent, or Firm* — Fitzpatrick, Cella, Harper & Scinto

(57) ABSTRACT

The present invention is to provide methods and apparatuses for creating color conversion definition to make the same output result appear without any uncomfortable feeling when a same output result is observed under different illumination lights. To achieve this, the method comprising the successive steps of: (a) assuming an observational environment under an illumination light in which a difference in color appearance of an output result of the image output device in a plurality of observational environments with different illumination lights to observe the output result is made less; (b) determining measured color values of a device color of the image output device in the observational environment under the illumination light in which a difference in each color appearance is made less; and (c) creating a color conversion definition on the basis of the measured color values of the device color of the image output device determined at step (b).

19 Claims, 13 Drawing Sheets

U.S. PATENT DOCUMENTS

| | | | | |
|---|---|---|---|---|
| 7,453,609 | B2* | 11/2008 | Itagaki | 358/518 |
| 7,457,000 | B2* | 11/2008 | Uchino | 358/1.9 |
| 7,564,601 | B2* | 7/2009 | Angal et al. | 358/504 |
| 7,929,760 | B2* | 4/2011 | Tamagawa | 382/167 |
| 2001/0040588 | A1* | 11/2001 | Shiraiwa et al. | 345/690 |
| 2003/0020725 | A1* | 1/2003 | Matsuda | 345/600 |
| 2003/0123072 | A1* | 7/2003 | Spronk | 358/1.9 |
| 2005/0140997 | A1* | 6/2005 | Shirasawa | 358/1.9 |
| 2005/0206928 | A1* | 9/2005 | Itagaki | 358/1.9 |
| 2005/0231740 | A1* | 10/2005 | Uchino | 358/1.9 |
| 2005/0237553 | A1* | 10/2005 | Takahashi et al. | 358/1.9 |
| 2006/0209320 | A1* | 9/2006 | Ariga | 358/1.9 |
| 2007/0115665 | A1* | 5/2007 | Mueller et al. | 362/276 |
| 2007/0230777 | A1* | 10/2007 | Tamagawa | 382/162 |
| 2007/0258240 | A1* | 11/2007 | Ducharme et al. | 362/231 |
| 2007/0273738 | A1* | 11/2007 | Tsuchiya | 347/100 |
| 2008/0218784 | A1* | 9/2008 | Ben-Chorin et al. | 358/1.9 |
| 2008/0219303 | A1* | 9/2008 | Chen et al. | 372/23 |
| 2009/0052771 | A1* | 2/2009 | Ohga | 382/165 |
| 2009/0195670 | A1* | 8/2009 | Koishi | 348/223.1 |
| 2009/0289951 | A1* | 11/2009 | Matsuda | 345/589 |
| 2011/0013242 | A1* | 1/2011 | Hagio et al. | 358/520 |
| 2011/0249141 | A1* | 10/2011 | Chen et al. | 348/223.1 |

FOREIGN PATENT DOCUMENTS

| | | |
|---|---|---|
| JP | 2003-153015 A | 5/2003 |
| JP | 2003-283851 A | 10/2003 |
| JP | 2004-101358 A | 4/2004 |

* cited by examiner

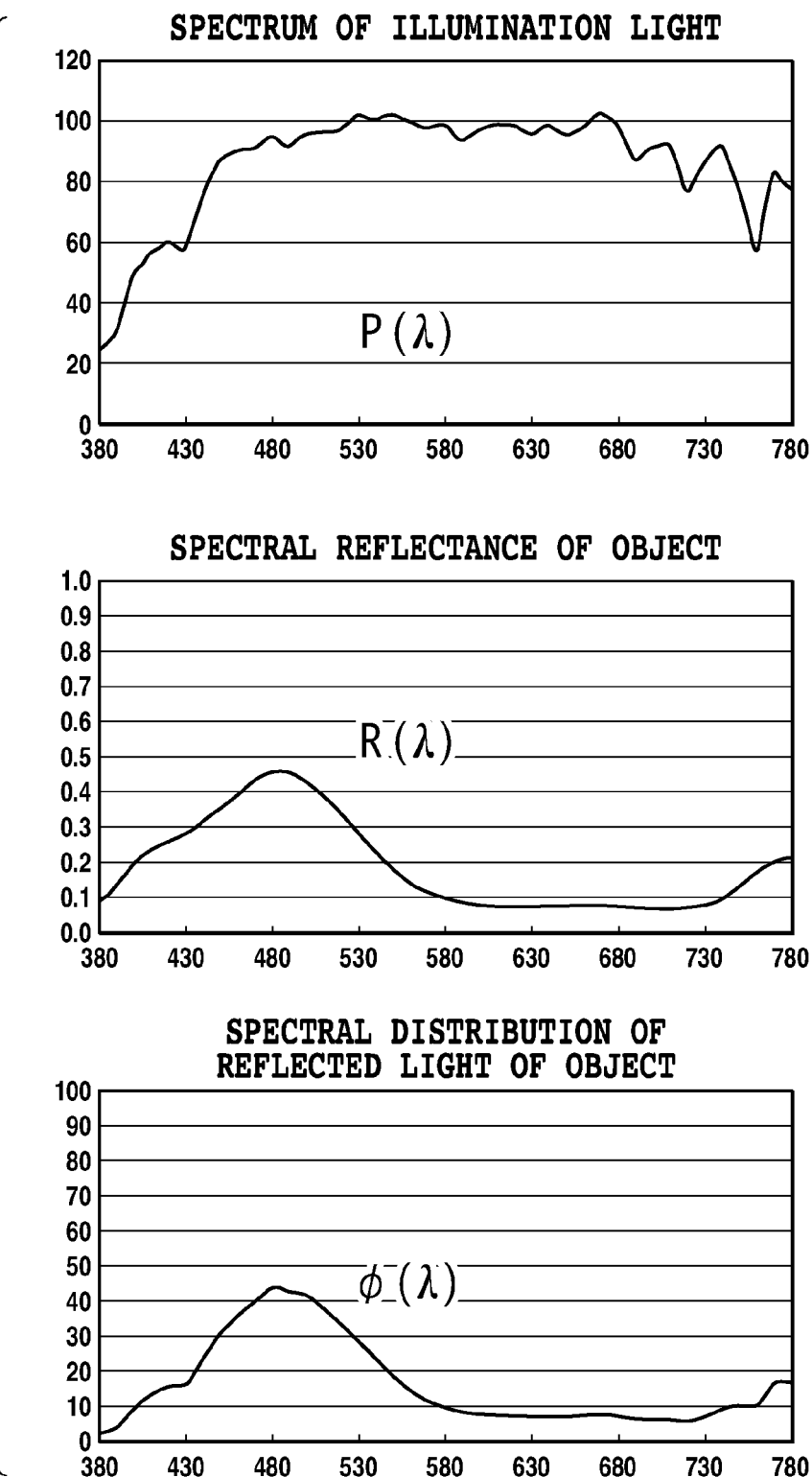

METHOD FOR CREATING COLOR CONVERSION DEFINITION FOR IMAGE OUTPUT DEVICES AND IMAGE PROCESSING APPARATUS IMPLEMENTING THE METHOD

BACKGROUND OF THE INVENTION

1. Field of the Invention

The present invention relates to a method for creating a color conversion definition (a look-up table or the like) for image output devices, and an image processing apparatus implementing the method for creating a color conversion definition.

2. Description of the Related Art

In consideration of color engineering, an illumination light illuminates an object, and a reflected light or a transmitted light enters human eyes to be recognized as a color of the object. As shown in FIG. 12, if a spectroscopy spectrum of an illumination light is P ($\lambda$), and a spectral reflectance of an object is R ($\lambda$), a spectral distribution $\phi$ ($\lambda$) of a reflected light which enters the human eyes from the object is expressed by $\phi(\lambda)=R(\lambda)P(\lambda)$.

Spectroscopy spectrum P ($\lambda$) of an illumination light, spectral reflectance R($\lambda$) of an object, and spectral distribution $\phi(\lambda)$ of a reflected light from the object are graphed in FIG. 13. The abscissas denote wavelengths (nm), and the ordinates denote radiant energies or reflectance factors.

A light $\phi(\lambda)$ entering an eye is converted into a signal through cones which are visual cells having photosensitivity on the retina, and the signal is transmitted to the brain to be recognized as a color. In consideration of color engineering, a response from the cones is handled as a CIEXYZ color coordinate system (hereinafter abbreviated as XYZ) If a spectral distribution of a reflected light is $\phi(\lambda)$, and color-matching functions are x ($\lambda$), y ($\lambda$), and z ($\lambda$), tristimulus values X, Y, and Z are expressed by:

$X = k\int\phi(\lambda)x(\lambda)d\lambda$ $Y = k\int\phi(\lambda)y(\lambda)d\lambda$ $Z = k\int\phi(\lambda)z(\lambda)d\lambda$ [Expression 1]

When the values of X, Y, and Z are the same, it is considered that a color does not vary even when a spectral distribution $\phi(\lambda)$ of a light entering an eye is different. This characteristic is utilized in image output devices such as printers and displays. In a printer, inks (cyan/magenta/yellow/black, and the like) are controlled such that a color supposed to be outputted and a color of an output result have the same values of X, Y, and Z under a given illumination light. Provided that X, Y, and Z having same values as values of X, Y, and Z of an input color are outputted, a printer is defined as a printer performing accurate output color reproduction. Further, provided that values of X, Y, and Z added with human favorability are calculated as values of X, Y, and Z of an input color, and the values of X, Y, and Z are outputted, a printer is defined as a printer performing favorable output color reproduction.

In a printer, generally, color appearance of an output result (output color reproduction) is determined by using a D50 illumination light serving as a supplemental illumination light by the CIE, as an illumination light. Output color reproduction is determined by making correspondence between an input color space and a device color space (RGB or CMYK) for an image output device, i.e., by making output color conversion definition. In order to carry out making correspondence of a device color space for an image output device to a color space, it is necessary to know the characteristic of the device color space.

In a case of a printer, a representative color (i.e. a color patch) as a device color of an image output device is actually outputted, and the color is measured, which makes it possible to know the characteristic of the device color space. As an algorithm for creating an output color conversion definition on the basis of the characteristic, a variety of algorithms have been conceived of by a number of manufacturers. Further, some manufacturers provide applications and modules by which it is possible to create an output color conversion definition suitable for the image output device when measured color values of a device color of an image output device are inputted, and users can utilize those.

It is assumed that objects with different reflectance factors or transmission factors have same values of X, Y, and Z under a given illumination light. However, in a case in which the illumination light is changed, those are not necessarily the same values of X, Y, and Z. In that case, when the illumination light is changed, colors of the object appear differently. That is, even if it is designated a color supposed to be outputted and a color of an output result for an image output device are made to have same values of X, Y, and Z under a given illumination light, when the illumination light is different, the color supposed to be outputted and the color of the output result do not necessarily have the same values of X, Y, and Z. That is, in an image output device such as a printer, because color appearance of an output result (output color reproduction) varies in accordance with an illumination light, it is necessary to consider output color reproduction in consideration of an illumination light to observe an output result.

A case in which different illumination lights are utilized as an illumination light in an observational environment for an output result by respective users such that a user A observes it under an illumination light A, a user B observes it under an illumination light B, and a user C observes it under an illumination light C, is conceivable. Further, even when a user is the same person, a case in which an observational environment for an output result of an image output device varies depending on periods of time such that it is under an illumination light A (sunlight) during daytime hours, and it is under an illumination light B (interior illumination) during nighttime hours, and a case in which an observational environment for an output result of an image output device varies depending on places for observation such that it is under an illumination light A at a place A, and it is under an illumination light B at a place B, are conceivable. It is necessary to consider output color reproduction under a plurality of illumination lights with respect to output color reproduction in an image output device.

In order to accurately perform output color reproduction in consideration of illumination lights, there is a method for realizing separate output color reproductions based on the illumination lights for respective illumination lights. This can be realized such that color conversion definitions to realize separate output color reproductions are prepared in advance for respective illumination lights, and a color conversion definition to realize output color reproduction under an arbitrary illumination light is determined on the basis of color conversion definitions to realize output color reproductions with respect to illumination lights prepared in advance. Further, it is possible to determine a color conversion definition dynamically in accordance with observational environments.

Further, it has been examined to create one color conversion definition by which it is possible to perform optimum output color reproduction in which an uncomfortable feeling in appearance under each illumination light is made less in consideration of an appearance of an output result under the illumination lights in a plurality of observational environments. In a technology disclosed in Japanese Patent Laid-Open No. 2003-283851, a color is measured under an illumination light A, and an output color conversion definition to optimize an output result under the illumination light A is created. Then, it has been disclosed in this document that a color of an output result by the created color conversion definition is measured under illumination lights A, B, and C, and the created output color conversion definition is modified such that a mean value or a centroid value of actual colors under respective illumination lights appears as a color supposed to be outputted. Further, in Japanese Patent Laid-Open No. 2003-153015, it has been disclosed that output color reproductions under the illumination lights A, B, and C are respectively determined, and an output color conversion definition is determined such that errors in those output color reproductions are made minimum.

As described above, it is preferable to take output color reproductions under a plurality of illumination lights into consideration with respect to output color reproduction of an image output device. That is, it is necessary to make the same output result appear without any uncomfortable feeling when a same output result is observed under different illumination lights.

As a conventional art, there has been a technology having an aim to optimize an output result in the observational environment in accordance with an illumination light in an observational environment of each user. Because it is an aim to optimize an output result in the observational environment in each observational environment, it is necessary to change an output result by changing a color conversion definition when an observational environment is changed. In an image output device such as a display, because the modification is easy, it suffices to change an output result. However, with respect to an output result printed by an image output device such as a printer, there is no method but a method of outputting again when an observational environment is changed.

There are many cases in which one printing object is viewed in different observational environments, it is necessary to output it in consideration of illumination lights in a plurality of observational environments. In order to solve these problems, it is necessary to create one color conversion definition by which it is possible to perform optimum output color reproduction in which an uncomfortable feeling in appearance of an output result under illumination lights in a plurality of observational environments, and an uncomfortable feeling in appearance under the respective illuminations are made less.

In the technology disclosed in Japanese Patent Laid-Open No. 2003-283851, a color is measured under a given illumination light A, and an output color conversion definition to optimize an output result under the illumination light A is created, and colors of the output result by the created color conversion definition are measured under illumination lights A, B, and C, and the color conversion definition is modified such that the output result have a mean value or a centroid value of the measured color values. Because it takes time for color measuring operation, it takes more time for measuring colors twice before and after creating the color conversion definition. Further, with respect to a mean value or a centroid value, all observational environments to be assumed are handled equally, it cannot be considered that this is necessarily favorable in all use cases.

For example, in a case in which there are three observational environments, supposing that a frequency in use is 50% in an observational environment A, 30% in an observational environment B, and 20% in an observational environment C, weighting must be applied to the observational environment A, and it is impossible for the conventional art to respond thereto. Briefly, it is preferable to realize optimum output color reproduction in accordance with a plurality of observational environments in which users actually use the image output device. However, in the conventional art, there has been no proposal or mention of a method for realizing that.

In the technology disclosed in Japanese Patent Laid-Open No. 2003-153015, it is necessary to perform a computation for an output result for each illumination light in a plurality of observational environments in order to minimize errors once, and the number of process for calculation and the number of processes for creation are many. Further, because a color conversion definition is created so as to minimize errors using a plurality of values of an output result, it is necessary to apply a unique algorithm for creating a color conversion definition, and other algorithms for creation cannot be applied thereto. In consideration of general versatility, the other algorithms are preferably applicable to such applications and modules by which it is possible to create a color conversion definition by using measured color values of a device color as input values in the conventional art.

In a printer, an output is carried out by controlling a plurality of color materials (cyan ink/magenta ink/yellow ink/black ink, and the like). Because reflectance factors of the respective color materials are different from one another, the extent of color shift of every illumination is different in every color material. That is, even in an output of the same image output device, because a combination of color materials differs depending on colors, an extent of color shift of every illumination is different depending on colors. In the conventional art, color correction added with this characteristic has not been carried out.

SUMMARY OF THE INVENTION

The present invention has been achieved in order to solve the above-described problems, and an object of the present invention is to perform optimum output color reproduction in which differences in appearance of an output result under the illumination lights in a plurality of observational environments are made smaller, i.e., an uncomfortable feeling in appearance under each illumination is made less. Another object of the present invention is to decrease the number of times of color measurement and the number of processes for calculation for creating a color conversion definition. Yet another object of the present invention is to respond to weighting regarding a frequency in use or the like in each observational environment under respective illumination lights, and realize a creation of a color conversion definition by a user, and to make a color correction of every color material possible. Further, another object of the present invention is to apply the invention to conventional applications and modules by which it is possible to create a color conversion definition. The other object of the present invention is to provide the following methods for creating a color conversion definition for realizing those, and image processing apparatuses implementing the method for creating a color conversion definition.

In the first aspect of the present invention, there is provided a method for creating a color conversion definition in an image output device, the method comprising the successive steps of: (a) assuming an observational environment under an illumination light in which a difference in color appearance of an output result of the image output device in a plurality of observational environments with different illumination lights to observe the output result is made less; (b) determining measured color values of a device color of the image output device in the observational environment under the illumination light in which a difference in each color appearance is made less; and (c) creating a color conversion definition on the basis of the measured color values of the device color of the image output device determined at step (b).

In the second aspect of the present invention, there is provided a method for creating a color conversion definition comprising the successive steps of: (a) assuming a plurality of observational environments with different illumination lights to observe an output result of the image output device, and determining measured color values of a device color of the image output device in the observational environment by using a illumination light in which the illumination lights are mixed; and (b) creating a color conversion definition on the basis of the measured color values of the device color of the image output device determined at step (a).

In the third aspect of the present invention, there is provided a method for creating a color conversion definition in an image output device, the method comprising the successive steps of: (a) selectively inputting observational environments under illumination lights to observe an output result of the image output device; (b) setting priorities on the selected observational environments, and determining measured color values of a device color of the image output device in the observational environment under the illumination light whose mixing ratio is changed in accordance with the priorities; and (c) creating a color conversion definition on the basis of the measured color values of the device color of the image output device determined at step (b).

In the fourth aspect of the present invention, there is provided an image processing apparatus comprising: measured color value computing means for assuming a plurality of observational environments with different illumination lights to observe an output result of the image output device, and determining measured color values of a device color of the image output device in the observational environment by using a illumination light in which the illumination lights are mixed; and color conversion definition creating means for creating a color conversion definition on the basis of the measured color values of the device color of the image output device determined by the measured color value computing means.

In the fifth aspect of the present invention, there is provided an image processing apparatus creating a color conversion definition for an image output device, the apparatus comprising: input means for selectively inputting observational environments under illumination lights to observe an output result of the image output device; measured color value computing means for setting priorities on the selected observational environments, and determining measured color values of a device color of the image output device in the observational environment under the illumination light whose mixing ratio is changed in accordance with the priorities; and color conversion definition creating means for creating a color conversion definition on the basis of the measured color values of the device color of the image output device determined by the measured color value computing means.

In accordance with the present invention, it is possible to perform optimum output color reproduction in which a difference in appearance of an output result under illumination lights in a plurality of observational environments are made smaller, i.e., an uncomfortable feeling in appearance under each illumination is reduced. Further, it is possible to decrease the number of times of color measurement and the number of processes for calculation for creating a color conversion definition. Further, it is possible to apply the invention to conventional applications and modules by which it is possible to create a color conversion definition by using measured color values of a device color as input values.

Moreover, it is possible to respond to weighting regarding a frequency in use or the like in each observational environment under each illumination light, and realize a creation of a color conversion definition by a user, and a color correction of every color material is possible as well.

Further features of the present invention will become apparent from the following description of exemplary embodiments (with reference to the attached drawings).

BRIEF DESCRIPTION OF THE DRAWINGS

FIG. 13 is an illustration showing exemplary graphs of a spectroscopy spectrum of an illumination light, a spectral reflectance of an object, and a spectral distribution of a reflected light from the object.

DESCRIPTION OF THE EMBODIMENTS

[First Embodiment]

Hereinafter, one embodiment of the present invention will be described with reference to the drawings.

Figure 1:
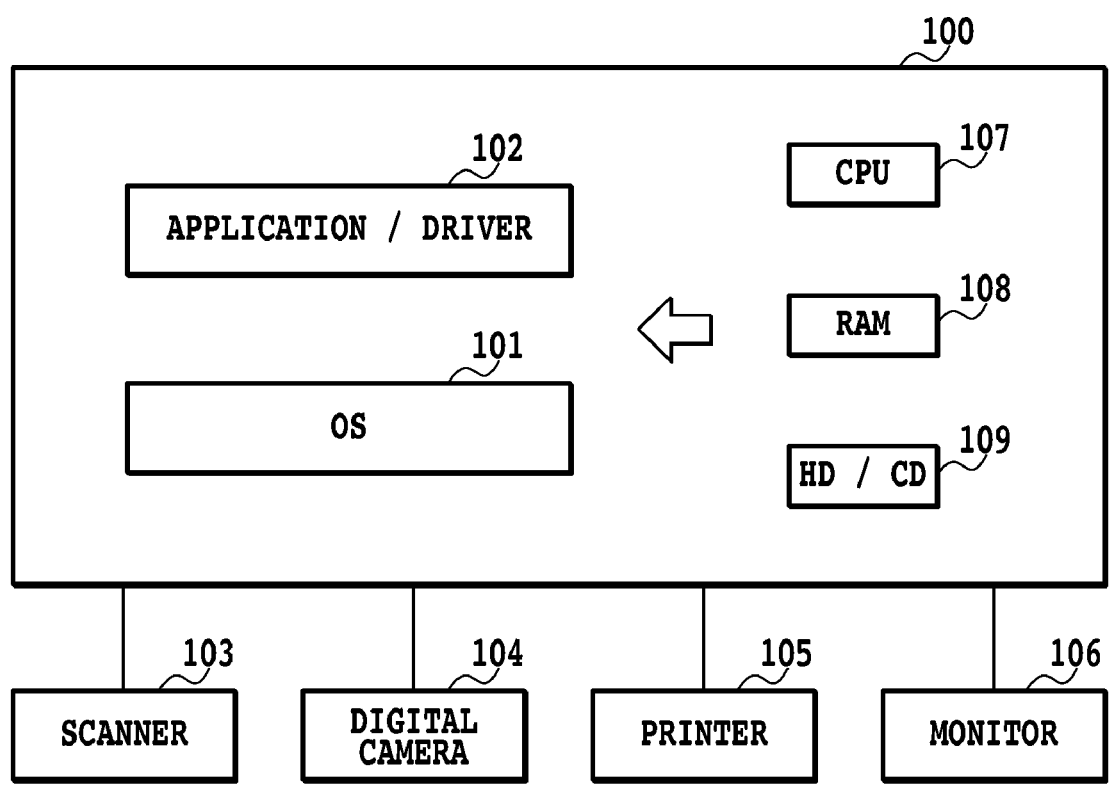
FIG. 1 is a block diagram showing a schematic configuration of an image processing apparatus according to one embodiment of the present invention.

FIG. 1 is a block diagram showing a schematic configuration of an image processing apparatus according to the embodiment of the present invention.

This system is composed of a host computer 100, a scanner 103 and a digital camera 104 serving as image input devices, and a printer 105 and a monitor 106 serving as image output devices. The scanner 103, the digital camera 104, the printer 105, and the monitor 106 are connected to the host computer 100 shown in the drawing. However, all the devices are not necessarily connected thereto, and only some devices may be connected thereto. The host computer 100 includes an OS (operating system) 101, and further includes applications to perform image processing and the like and drivers 102 for the respective input/output devices under the control of the OS 101.

Further, the host computer 100 includes a central processing unit (processor: CPU) 107, a random access memory (RAM) 108, and storage device such as a hard disk (HD) 109 and the like, as various types of hardware which are capable of operating in accordance with the software described above and the like. The host computer 100 further includes a recording medium such as a CD or a DVD, and a recording medium reading device 109, and the like. Various types of software are stored in advance in the storage device such as a hard disk (HD) 109, the recording medium such as a CD or a DVD, and the recording medium reading device 109, and those are read out to be used as needed. Then, the CPU 107 executes processings according to the above-described software or the like. In addition, the RAM 108 is used as a work area for executing processing by the CPU 107, and the like.

Image data is loaded into the host computer 100 as needed from an image input device such as a scanner 103 or a digital camera. Further, image data is loaded in advance from an image input device, and can be stored in a recording device or the recording medium readout device (HD/CD) 109 into which a recording medium is read. Moreover, image data may be stored in a recording medium in another host computer (including a server) connected to the host computer 100.

It is possible to transfer image data from an image input device to the host computer 100 through cable communication via a card reader or a cable connection, or through infrared communication or radio communication. As a matter of course, image data may be not moved to the recording medium in the host computer 100, but the image data may be directly read from a memory card or a built-in memory which the image input device has by connecting an image input device and the host computer through the cable communication, the infrared data communication, or the radio communication.

Figure 2:
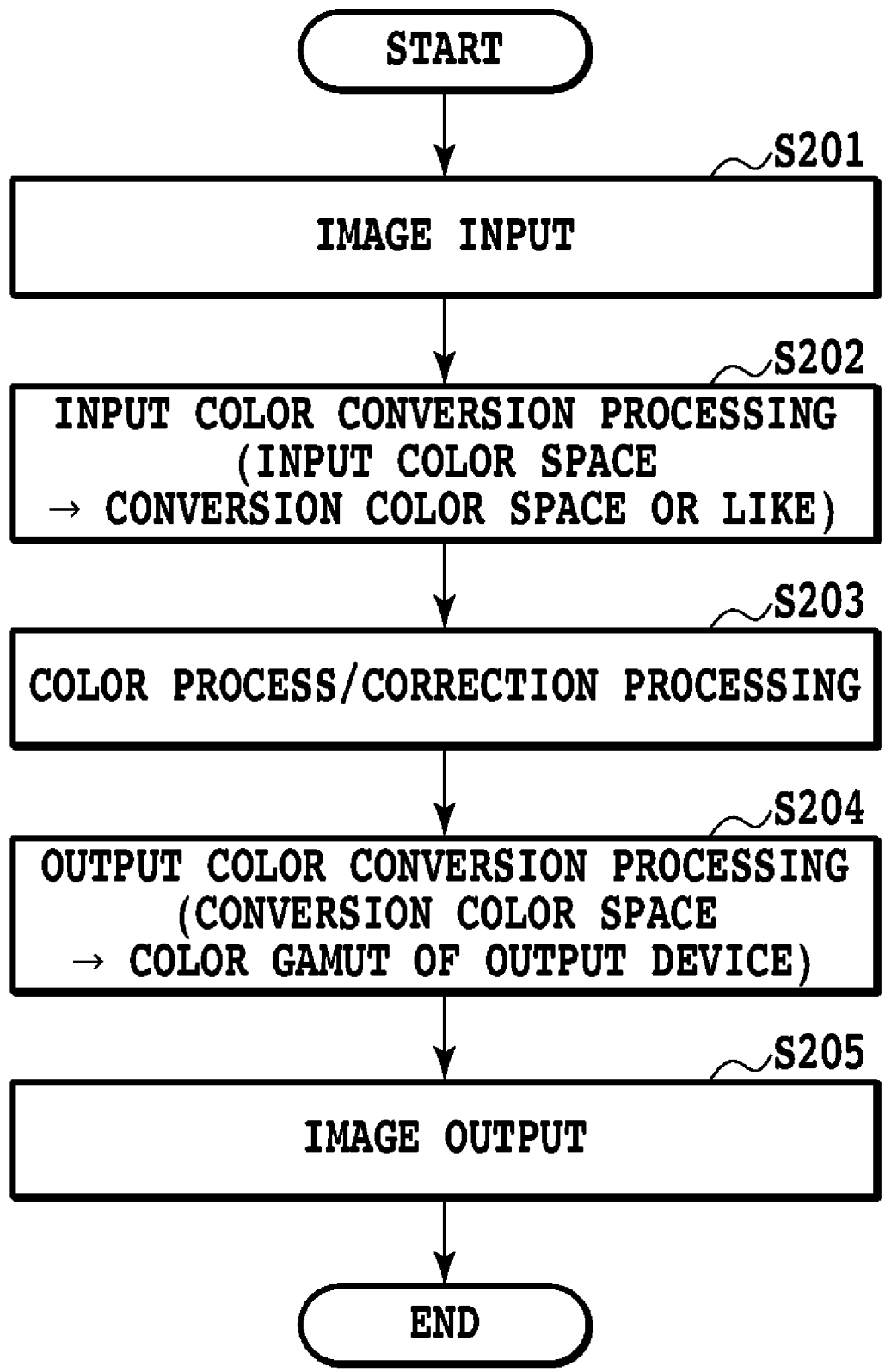
FIG. 2 is a flowchart showing a color conversion flow of input image data from an image input device to an image output device according to the embodiment of the present invention.

FIG. 2 is a chart for explanation of color conversion of input image data from an image input device to an image output device.

The input image data is loaded from the image input device at step S201.

Next, at step S202, input color conversion processing is executed onto the image inputted at step S201. Input color conversion processing means that image data is converted from an input color space into another color space (shown as a conversion color space in FIG. 2).

Next, at step S203, color process/color correction processings are performed. That is, processings such as changes in brightness, hue, and saturation of the image data are executed.

Moreover, at step S204, output color conversion processing is executed onto the image data, which executes color space conversion to an output color space corresponding to the image output device.

Finally, at step S205, after processings specific to the image output device as processings of the image output device, an output of the image is carried out. In a case of the printer, after color separation processing and quantized processing are executed, an output of the image is carried out.

At step S202, as an input color space of the image data, a standardized color space of SRGB, AdobeRGB, SYCC, or the like, a device color space of the image input device, or the like can be considered of. At step S202, the image data is generally converted from an input color space into a color space in which color process/color corrections processing are performed, a uniform color space such as a color space of a CIEL*a*b* color coordinate system (hereinafter abbreviated as a Lab color space), an XYZ color space, or the like. Further, there may be used values such as h(hue), J(brightness), and C(chroma), or h(hue), Q(brightness), and M(colorfulness) (hereinafter abbreviated as JCh and QMh color spaces) which are correlation amounts of color perception calculated by CIECAM02 corresponding to a color perception model such as color adaptation. However, an input color space and a color space in which color process/color correction processing are performed may be the same, and in that case, step S202 can be omitted.

At step S203, color process/color correction processing are not necessarily performed, and may be omitted. Those may be performed manually by a user, or may be automatically performed by analyzing the image data. Further, the processings at step S203 may be executed in the input color space or in the output color space. However, in a case in which the processings are executed in the input color space, the processings are processed in the order of step S203 and step S202, and in a case in which the processings are executed in the output color space, the processings are processed in the order of step S204 and step S203.

At step S204, as an output color space of the image output device, a device color space of the image output device or the like can be considered of, and in a case of an RGB printer, it is an RGB color space, and in a case of a CMYK printer, it is a CMYK color space. At step S204, conversion from a color space in which color process/color correction processing are performed or a uniform color space of Lab color space or the like, which has been converted at step S202, to an output color space of the image output device is executed. In a case in which step S202 is omitted, conversion from the input color space into the output color space is executed at step S204. At the time of color conversion, the color conversion added with color reproducibility depending on purposes is executed (the details will be described later). There is color reproducibility with a high regard for gradient, color reproducibility with a high regard for saturation, color reproducibility with a high regard for calorimetric accordance, color reproducibility with a high regard for memory color, and the like, and these may be separately realized.

As a method for color space conversion, a color look-up table conversion, a matrix conversion and a γ conversion, a conversion by formulas, and the like have been known. However, any method may be used. A plurality of these methods may be combined. A color conversion definition is, to be more precise, a color look-up table, a matrix, gamma values, formulas, or the like to execute color conversion. Hereinafter, in the description, color space conversion using a look-up table (hereinafter described as a LUT as well) as a color conversion definition will be described.

(Method for Creating Output Color Conversion Definition)

Making correspondence for executing conversion from a given color space into another color space is defined as color conversion definition. Further, a color conversion definition for color conversion from the input color space executed at step S202 is defined as an input color conversion definition, and a color conversion definition for color conversion to the device color space of the image output device executed at step S204 is defined as an output color conversion definition.

Here, a method for creating a look-up table serving as a color conversion definition from a color space in which color process/color correction processings are executed to a device color space of an image output device will be described in detail. In the present embodiment, the description will be carried out by using an SRGB color space as a color space in which color process/color correction processings are executed. As a method for creating the look-up table, it is the same as in cases of an RGB color space of AdobeRGB or the like, a color space of XYZ/Lab/JCh or the like, and other color spaces other than the SRG color space.

Creating a look-up table means that a device color of an image output device is determined as an output with respect to an input color at lattice points configuring a color table. First, an input color at the lattice points configuring the color table is determined, and next, a color included in a color gamut of the image output device is determined as an output color with respect to the input color at the lattice points configuring the color table. Then, finally, a device color of the image output device which is most proximate to the output color is searched to be output values at the lattice points, which makes it possible to create an LUT. These processings are generally executed in a uniform color space (a color space of Lab, Luv, JCh, or the like). In the present embodiment, the processings will be described by using a Lab color space.

First, an input color at the lattice points configuring the color table is determined. When an LUT from a color space in which color process/color correction processings are executed to a device color space of the image output device is created, a color in an SRGB color space is converted into a color in a uniform color space (a Lab color space) on the basis of a definitional equation, and this is defined as an input color.

Next, an output color with respect to the input color is determined. Color conversion is executed in consideration of favorability, a memory color, and the like, and a value after the color conversion maybe defined as an output color. A color conversion method taking favorability and a memory color into consideration can be realized so as to execute nonlinear conversion in an RGB color space, or to change brightness or luminance of color, hue, saturation, and the like.

However, the input color or the output color in which color conversion is executed in consideration of favorability and a memory color are not necessarily included within the output color gamut of the image output device. Because a color reproduction region of the input color or the output color in which color conversion is executed in consideration of favorability and a memory color and a color reproduction region of the image output device are different from one another, there is the problem that there is input color outside of the color gamut of the image output device. Therefore, there are cases in which it is necessary to carry out mapping to compress the input color/output color outside of the color gamut of the image output device within the color gamut.

In a compression method, algorithm corresponding to the color reproducibility of an LUT to be created is used. As existing technologies, it has been considered to compress a color such that measured color values are made equal within the color gamut of the image output device (the color reproducibility with a high regard for colorimetric accordance), and to compress a color so as to maintain brightness and saturation (the color reproducibility with a high regard for brightness and the color reproducibility with a high regard for saturation). Further, it has been considered not to compress a color on the boundary phase of the color gamut in consideration of gradient, but to compress a color into the color gamut of the image output device in accordance with saturation of the input color (the color reproducibility with a high regard for gradient). In this way, an output color stored within the color gamut of the image output device as needed is determined. In a case in which color conversion taking favorability and a memory color into consideration and compression of a color within the color gamut of the image output device are not carried out, the input color is directly defined as an output color. Finally, a device color of the image output device which is most proximate to the computed output color is searched to be output values at the lattice points thereof, which results in a creation of an LUT.

In an inkjet printer, because complex and diverse factors, such as a change in coloring due to color mixture of inks, a change in coloring due to osmotic ways of inks into a recording medium, and the like are related to coloring, it is difficult to predict a coloring characteristic thereof. Accordingly, in order to express the color reproducibility and the color gamut of the inkjet printer while avoiding the difficulty to predict coloring, Lab data corresponding to a particular device color is determined by the following method.

First, a color patch is printed at appropriate sampling intervals with a possible combination of device colors. Then, by measuring the color patch with a calorimeter such as, for example, a Spectrolino by GretagMacbeth, lattice point data of the LUT from the device color to the Lab values is determined.

Where a number of lattice points configuring the LUT from the device color to the Lab values are 9*9*9=729 to be outputted, those colors are measured. Lab values corresponding to an arbitrary device color can be estimated from the Lab values at the lattice points by using a well-known interpolation operation such as, for example, tetrahedral interpolation or the like, with respect to the LUT from the determined device color to the Lab values.

Provided that an input color corresponding to the lattice points configuring the determined color table and estimated and color-measured Lab values corresponding to the device color are compared, and points capable of approximating such points at which a color difference is made minimum are searched, it is possible to determine values of the device color serving as a color corresponding to the lattice points. It is possible to create a color table by executing the same processing onto all the lattice points configuring the color table. In addition, it is necessary to measure a color of the color patch of the device color in advance because measured color values of the color patch of the device color are used for determining a color gamut at the time of compression of color into the color gamut of the image output device.

Figure 3:
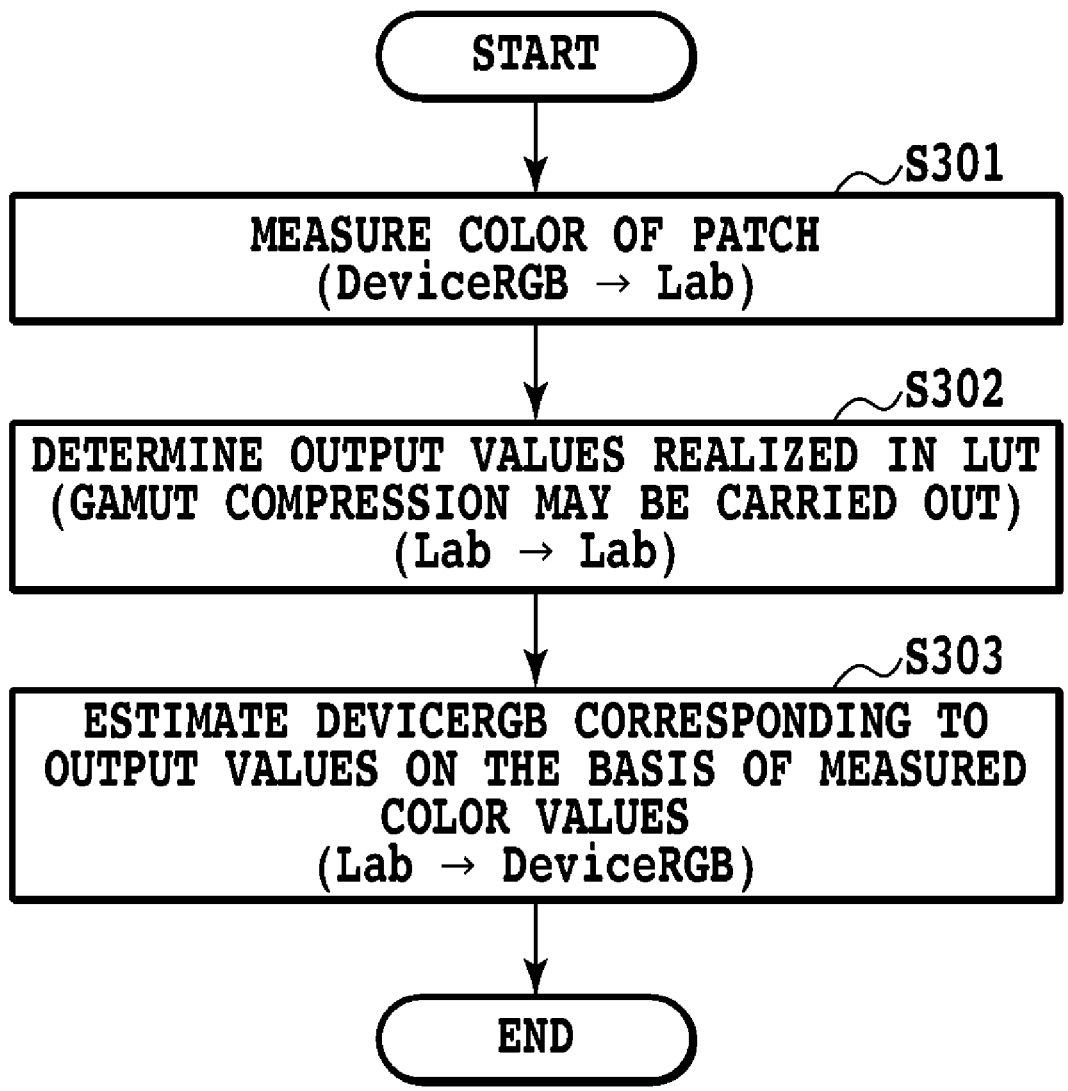
FIG. 3 is a flowchart showing the procedure for creating an output color conversion definition (a look-up table) according to the embodiment of the present invention.

The procedure of creating the look-up table is organized in FIG. 3.

At step S301, the color patch of the device color of the image output device is color-measured. At step S302, an output color realized by an LUT is determined. At step S303, a device color corresponding to the output color is estimated on the basis of the measured color values, which creates an LUT.

Here, one example as the method for creating a look-up table has been described. However, in the present embodiment, any creating method which is a method for creating a look-up table by using measured color values of a device color space of an image output device, can be used.

Further, the method for creating a look-up table among output color conversion definitions has been described in detail. However, this is the same as in matrix conversion and conversion by formulas. At step S301, a color patch of an output result of the image output device is color-measured. At step S302, an output color realized by an output color conversion definition is determined. At step S303, a correspondence between the output color and a device color is estimated on the basis of the measured color values of the patch, by which a color conversion definition is created. In cases of matrix conversion and γ conversion, a matrix coefficient and a γ coefficient to optimize color are determined. In a case of conversion by formulas, a coefficient included in a conversion equation or the like is determined.

(Method for Creating Output Color Conversion Definition)

Figure 4:
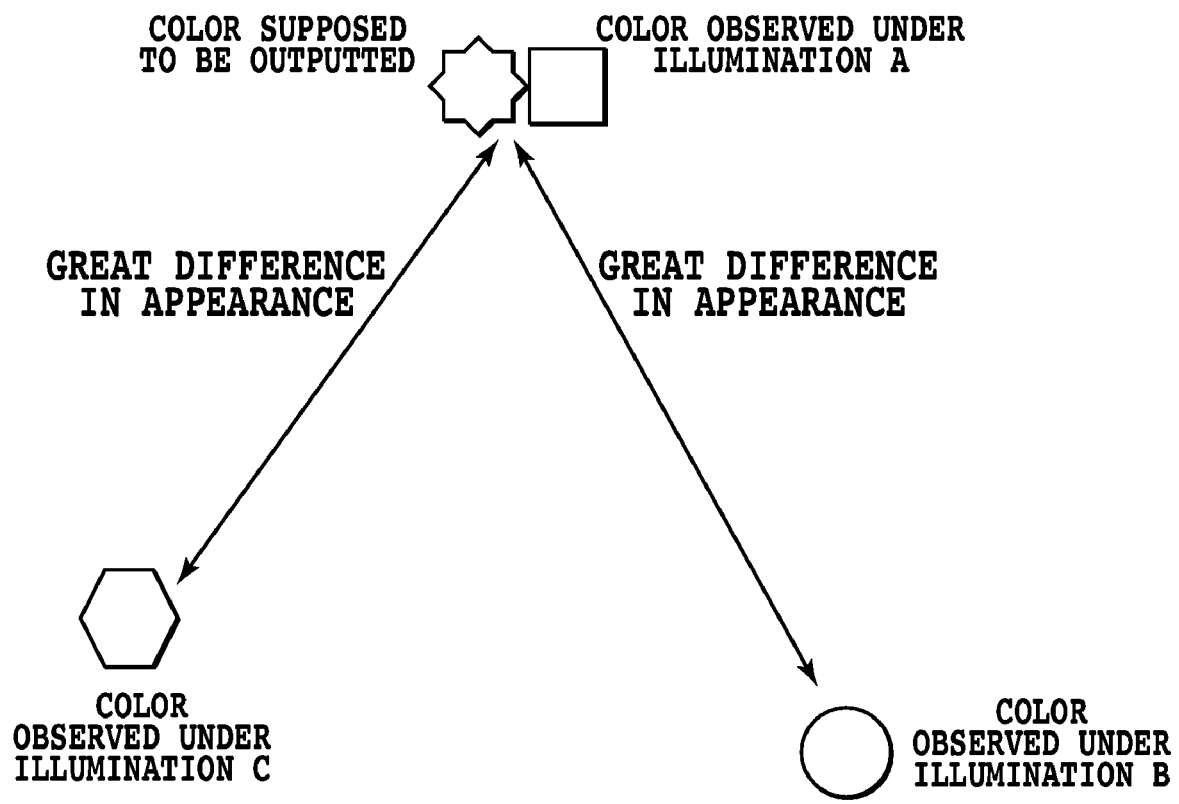
FIG. 4 is a conceptual illustration showing a difference in color appearance under each illumination light of an output result by use of an output color conversion definition according to a conventional art.

Illumination lights in observational environments assumed are defined as an illumination light A, an illumination light B, and an illumination light C. Then, a case is examined in which a look-up table is created at the same time when an observation is made under a given illumination light A as in a conventional method. As shown in FIG. 4, with respect to a color A in image data, a look-up table is created such that an output result of the image output device appears as the color A under the illumination light A. Because a color in appearance varies when an illumination light is changed, it appears as a color B under the illumination light B, and it appears as a color C under the illumination light C, which are shifted from the color A. That is, when the output result is observed under the illumination light A, this is correctly outputted. However, when the output result is observed under the illumination lights B and C, this appears so as to be greatly shifted.

Figure 5:
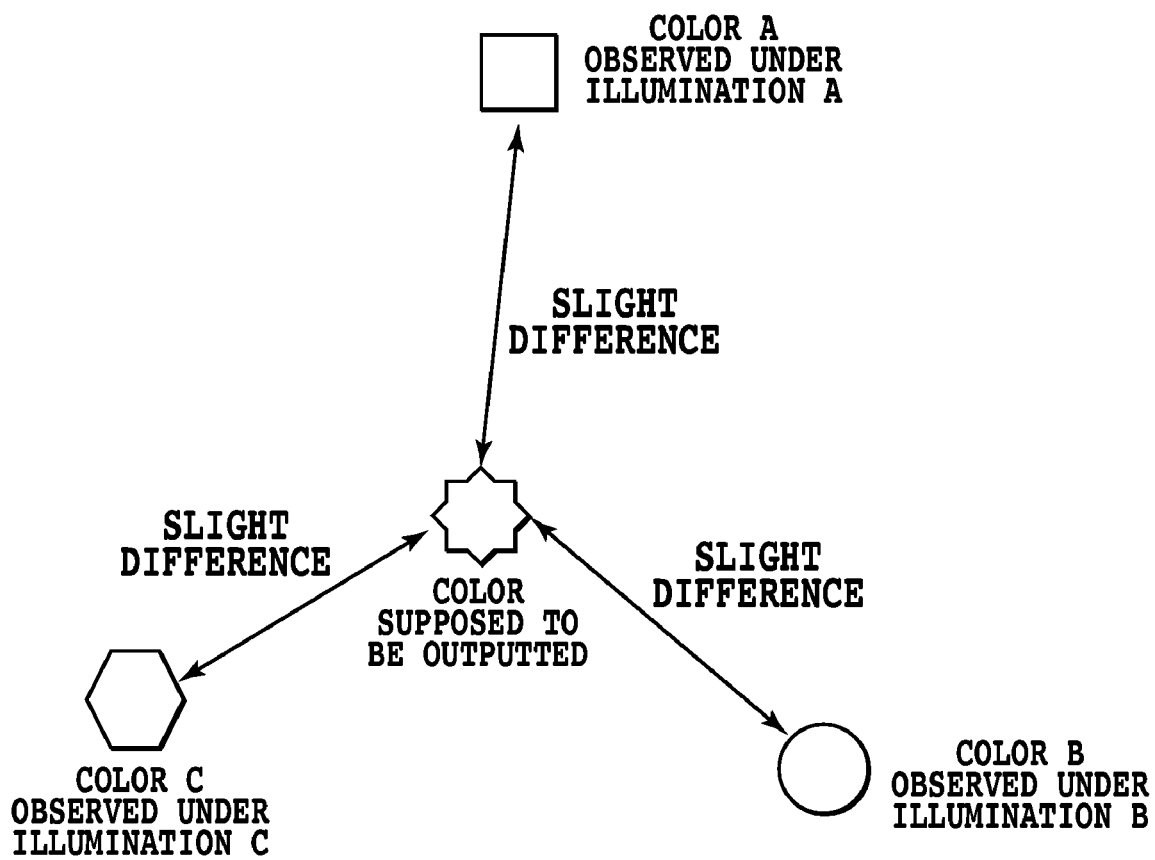
FIG. 5 is a conceptual illustration showing one example of an output result in which a difference in color appearance under each illumination light is made smaller.

In order to decrease an uncomfortable feeling under each illumination light, it is necessary to take color differences between the color A actually outputted and the colors under the respective illuminations (the color A under the illumination light A, the color B under the illumination light B, and the color C under the illumination light C) into account. As shown in FIG. 5, it is necessary to make differences between a color supposed to be outputted and each color under the respective illumination lights less than differences between an output color by a color conversion definition created under a given illumination light and each color under the respective illumination lights.

Next, one embodiment according to the present invention will be described.

To simplify the explanation, descriptions thereof will be carried out by using two illumination lights.

Figure 6:
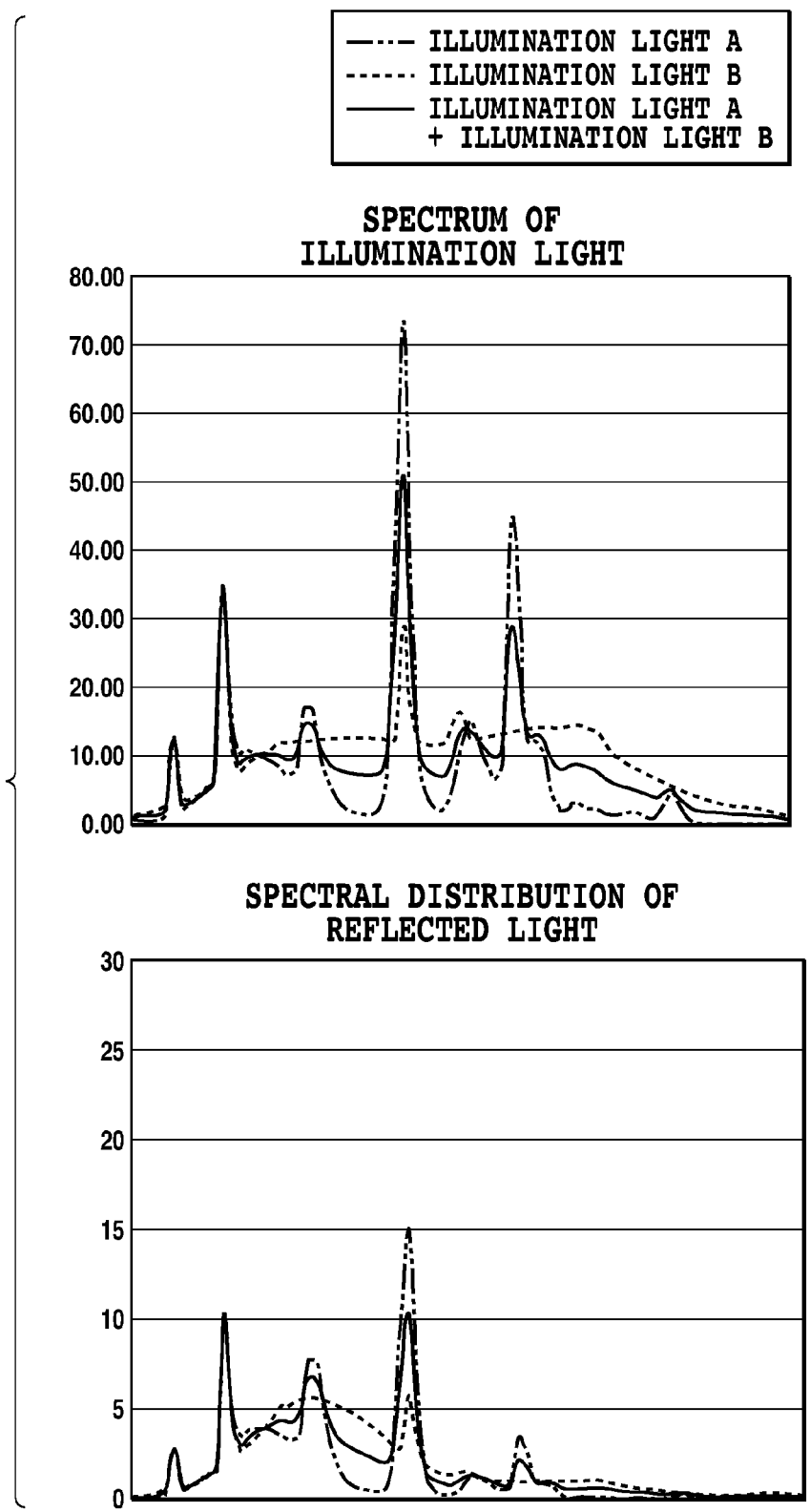
FIG. 6 are graphs showing examples of spectroscopy spectra of respective illumination lights and a spectroscopy spectrum of a mixed illumination light, and spectral reflectance of an object under the respective illumination lights and a spectral distribution of a reflected light of the object under the mixed illumination light.

For example, with respect to the illumination light A and the illumination light B, an observational environment in which the illumination light A and the illumination light B are mixed is examined. As shown in FIG. 6, if a spectroscopy spectrum of the illumination light A is $Pa(\lambda)$, and a spectroscopy spectrum of the illumination light B is $Pb(\lambda)$, a spectroscopy spectrum $P(\lambda)$ of an illumination light in which both lights are mixed with a ratio of 1:1 is $P(\lambda)=(Pa(\lambda)+Pb(\lambda))/2$. If a spectral reflectance of an object is $R(\lambda)$, a spectral distribution of a reflected light under the illumination light A is $\phi a(\lambda)=Pa(\lambda)R(\lambda)$, and a spectral distribution of a reflected light under the illumination light B is $\phi b(\lambda)=Pb(\lambda)R(\lambda)$, and a spectral distribution $\phi(\lambda)$ of a reflected light under the mixed illumination light is $\phi(\lambda)=P(\lambda)R(\lambda)$.

To illustrate the distributions, these are as shown in FIG. 6. The spectral distribution $\phi(\lambda)$ is an intermediate value between the spectral distribution $\phi a (\lambda)$ and the spectral distribution $\phi b (\lambda)$, which corresponds to an intermediate color between the color A of the illumination light A and the color B of the illumination light B. A color appearing in the observational environment in which the illumination light A and the illumination light B are mixed is approximate to the color B observed under the illumination light B more than the color A observed under the illumination light A, and is approximate to the color A observed under the illumination light A more than the color B observed under the illumination light B, which can be said that the color is a color with a less uncomfortable feeling in cases of observations under the illumination light A and the illumination light B respectively. In the same way, a color appearing in the observational environment in which the illumination light B and the illumination light C are mixed is approximate to the color C observed under the illumination light C more than the color B observed under the illumination light B. A color appearing in the observational environment in which the illumination light C and the illumination light A are mixed is approximate to the color A observed under the illumination light A more than the color C observed under the illumination light C.

Figure 7:
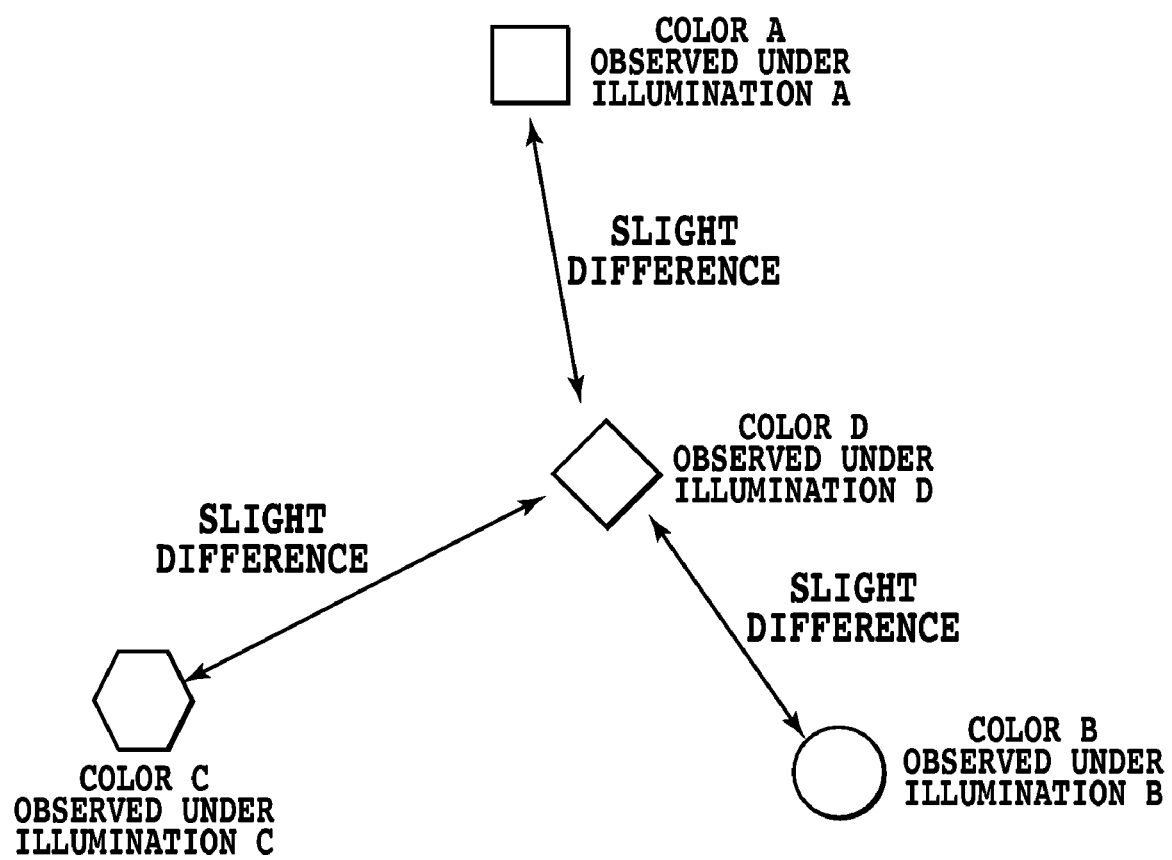
FIG. 7 is a conceptual illustration showing a difference in color appearance under each illumination light and a difference in color appearance under an illumination light in which the respective illumination lights are mixed.

Here, an observational environment D in which the illumination light A, the illumination light B, and the illumination light C are mixed (an observational environment under an illumination light in which the illumination light A, the illumination light B, and the illumination light C are mixed) will be examined. As shown in FIG. 7, a color D appearing in the observational environment D is approximate to the color B and the color C more than the color A observed under the illumination light A, and is approximate to the color A and the color C more than the color B observed under the illumination light B, and is approximate to the color A and the color B more than the color C observed under the illumination light C. That is, the color D in appearance in the observational environment under the illumination light in which the illumination light A, the illumination light B, and the illumination light C are mixed (i.e., the illumination light A+the illumination light B+the illumination light C) correlates with the color A of the illumination light A, the color B of the illumination light B, and color C of the illumination light C, which can be said that there is a less uncomfortable feeling in visual effects.

Figure 8:
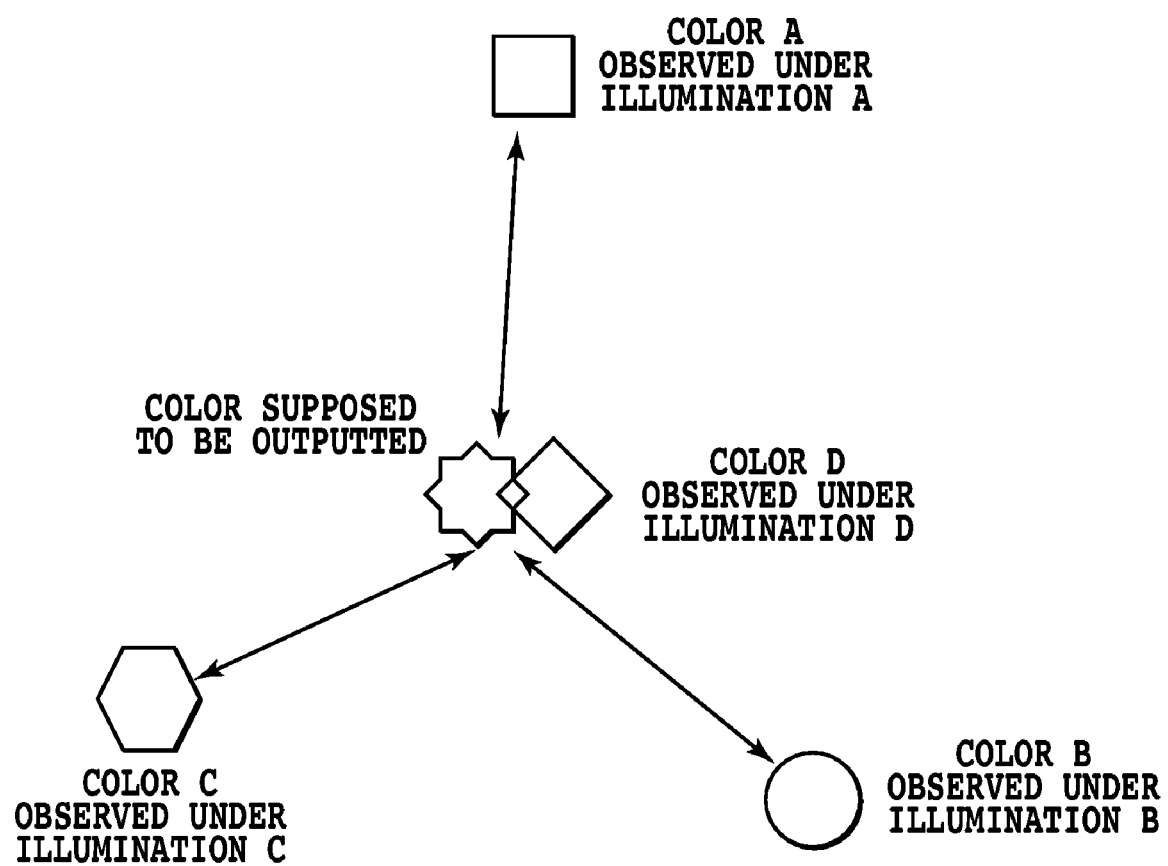
FIG. 8 is a conceptual illustration showing a difference in color appearance under each illumination light of an output result by use of an output color conversion definition in consideration of observational environments under a plurality of illumination lights according to one embodiment of the present invention.

Then, a case in which a color supposed to be outputted is matched to the color D in appearance under the observational environment D will be examined. As shown in FIG. 8, the colors under the respective illuminations (the color A under the illumination light A, the color B under the illumination light B, and the color C under the illumination light C) and the color D are naturally different from one another. However, it can be estimated that there is less uncomfortable feeling in each appearance. Therefore, in the present embodiment, in a case in which there are a plurality of observational environments, an illumination light in which the illumination lights in the respective observational environments are mixed is defined as a virtual illumination light, and a color conversion definition is created such that a color in an observational environment under the mixed illumination light is made to be a predetermined color. The colors under the respective illuminations (the color A under the illumination light A, the color B under the illumination light B, and the color C under the illumination light C) with respect to an output result by using the color conversion definition created on the basis of the virtual illumination light bring about results with a less uncomfortable feeling with regard to a color supposed to be outputted.

The method for creating an output color conversion definition (a look-up table) in the present embodiment will be described by use of FIG. 9.

First, at step S901, a plurality of observational environments assumed that an output result of the image output device is observed therein, and illumination lights in the respective observational environments are determined, and an illumination light is assumed/determined as a mixed illumination light based on the illumination lights in the respective observational environments.

Next, at S902, measured color values of a color patch output (printed) from the image output device under the mixed illumination light (a color patch for a device color) are determined.

Finally, at S903 and S904, a look-up table is created on the basis of the measured color values (the details are as follows).

At the time of determining observational environments at step S901, as one example, it is possible to assume representative observational environments and illumination lights which users frequently use. Here, three observational environments and illumination lights of the observational environment A under the illumination light A, the observational environment B under the illumination light B, and the observational environment C under the illumination light C are assumed. For example, among standard lights/supplemental standard lights/representative fluorescent lamps specified by the CIE, a combination of illumination lights with different color temperatures, such as a D50 illumination light as the illumination light A and a D65 illumination light as the illumination light B, can be considered of. Or, a combination of illumination lights with a same color temperature and different spectroscopy spectra (a D50 as the illumination light A, and an F8 as the illumination light B, and an F10 as the illumination light C) can be considered of. Moreover, an illumination light in which the respective illumination lights are mixed is assumed. In this case, the illumination light A plus the illumination light B plus the illumination light C means an illumination light in which the three lights of the illumination light A, the illumination light B, and the illumination light C are combined with a ratio of 1:1:1.

At step S902, colors are measured under the mixed illumination light. Spectroscopy spectra of the respective illumination lights and spectral reflectance of the color patch for the device color of the image output device are measured, and measured color values can be computed on the basis of the data thereof. Provided that the observational environments under the illumination lights are prepared, and a standard white board is measured by a spectral radiometer in actuality, it is possible to obtain spectroscopy spectra of the respective illumination lights. In a case of standard light/supplemental standard light/representative fluorescent lamp specified by the CIE, the values of specified spectroscopy spectra can be utilized.

If a spectroscopy spectrum of the illumination light A is Pa($\lambda$), a spectroscopy spectrum of the illumination light B is Pb($\lambda$), and a spectroscopy spectrum of the illumination light C is Pc($\lambda$), a spectroscopy spectrum Pd($\lambda$) of the illumination light D in which the three lights are mixed is:

$$Pd(\lambda)=(Pa(\lambda)+Pb(\lambda)+Pc(\lambda))/3.$$

Provided that the spectroscopy spectrum Pd ($\lambda$) of the mixed illumination light D is multiplied by a spectral reflectance R($\lambda$) of the color patch for the device color of the image output device, it is possible to obtain a spectral distribution $\phi d(\lambda)$ of a reflected light as follows.

$$\phi d(\lambda)=Pd(\lambda)R(\lambda)$$

Lab values computed on the basis of the spectral distribution $\phi d(\lambda)$ of the reflected light are defined as measured color values of the color patch for the device color of the image output device under the mixed illumination light D. Or, as a method for measuring color, a mixed illumination light in which lights are combined may be actually prepared, and the color patch for the device color of the image output device may be actually color-measured in that observational environment.

At step S903 and S904, a look-up table is created on the basis of the measured color values. The method for creating a look-up table has been described above. However, there is no limitation on the aforementioned method, and another method may be used.

Figure 10:
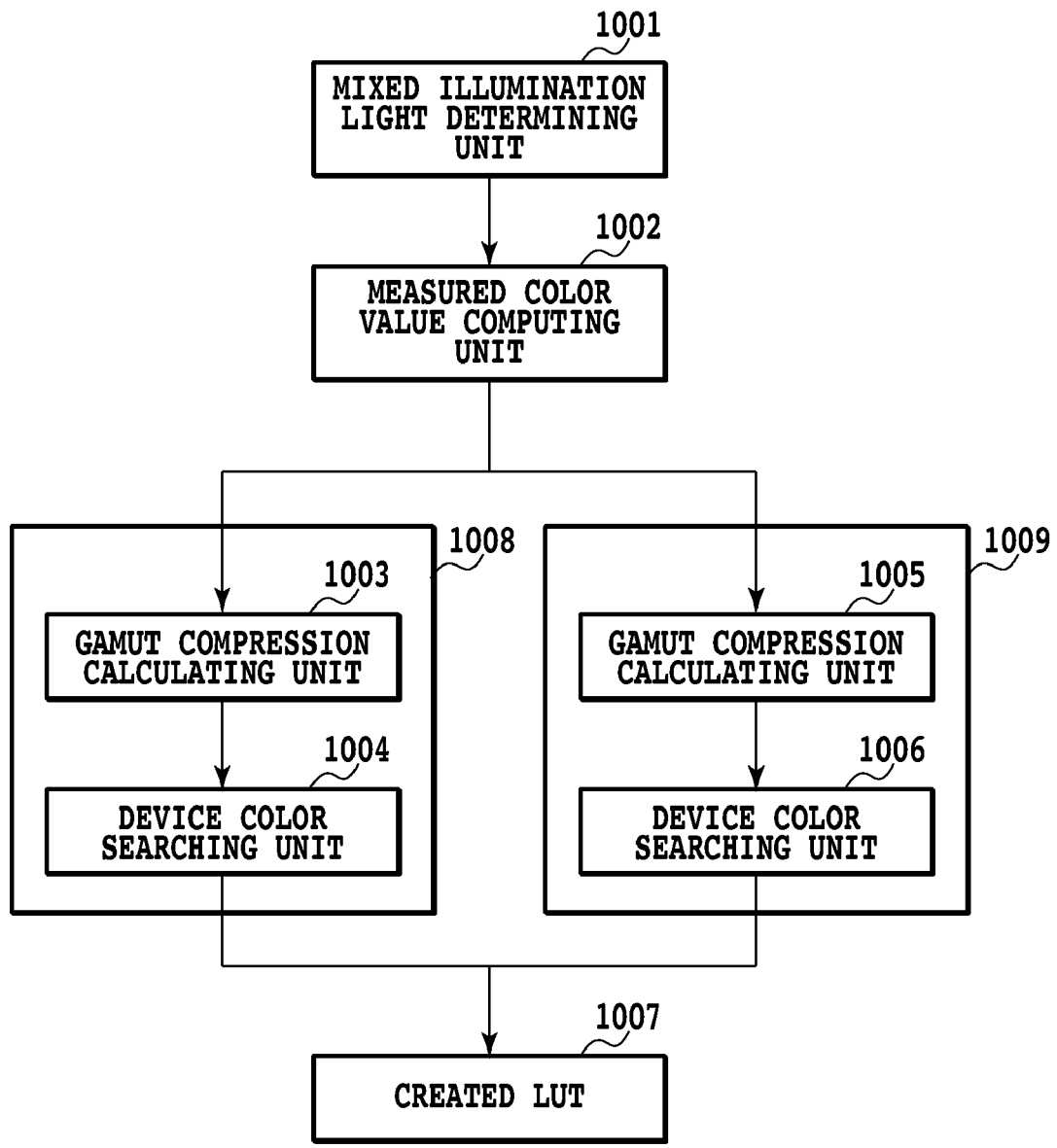
FIG. 10 is a block diagram showing a means for creating an output color conversion definition (a look-up table) in consideration of observational environments under a plurality of illumination lights according to the embodiment of the present invention.

Next, a configuration of a device for creating an output color conversion definition (a look-up table) in the present embodiment will be described by use of FIG. 10.

A mixed illumination light determining unit 1001 determines a plurality of observational environments and illumination lights in the respective observational environments, which are assumed that an output result of the image output device is observed therein, and assumes/determines an illumination light in which the illumination lights in the respective observational environments are mixed.

A measured color value computing unit 1002 determines measured color values of a color patch under the mixed illumination light.

Figure 9:
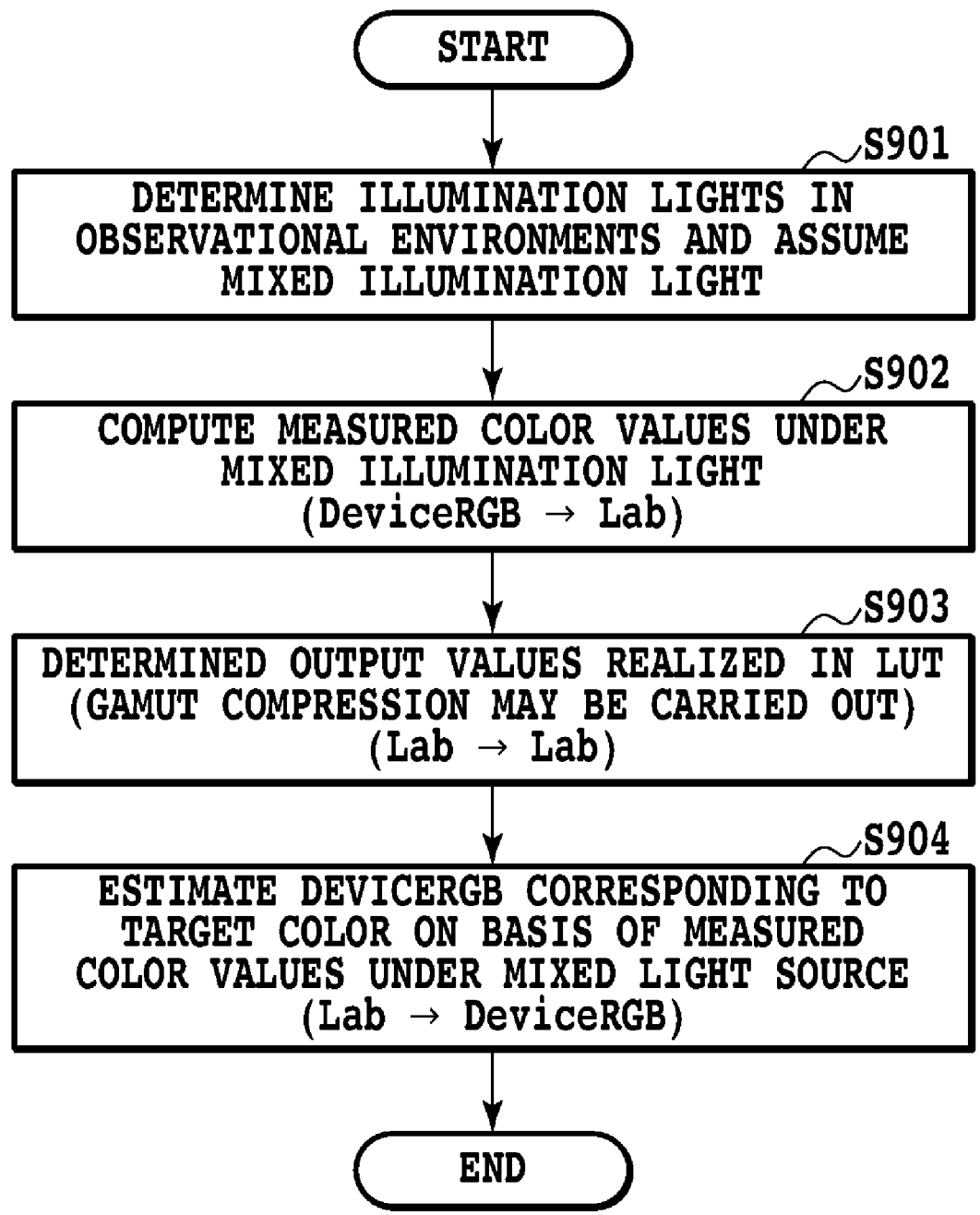
FIG. 9 is a flowchart showing the procedure for creating an output color conversion definition (a look-up table) in consideration of observational environments under a plurality of illumination lights according to the embodiment of the present invention.

As described above, a look-up table is created on the basis of the measured color values at steps S903 and S904 (FIG. 9). Because any method for creating a look-up table can be used, in the present embodiment, it is possible to select different methods for creating a look-up table for a creating module 1008 and a creating module 1009, and those can be switched to be used, where it a matter of course that even one creating module may be sufficient.

The respective creating modules are composed of gamut compression calculating units 1003/1005 corresponding to step S903 and device color searching units 1004/1006 corresponding to step S904. A look-up table 1007 is created and outputted by these modules. Further, in the aforementioned description, the illumination lights are combined with a ratio of 1:1:1 at step S901. However, this is not necessarily limited thereto.

In the technology disclosed in Japanese Patent Laid-Open No. 2003-283851, when the illumination lights A, B, and C are determined, an LUT to be created is uniquely determined. This is because a minimum color difference, a mean value, and a centroid as well are uniquely determined. That is, this is because of nothing more or less than that all the illumination light A, illumination light B, and illumination light C are handled equally. However, in practice, there are cases in which it is unfavorable that the illumination lights are handled equally in accordance with an intended use.

Here, in a case in which a frequency in use is 50% in the observational environment A, 30% in the observational environment B, and 20% in the observational environment C, weighting must be applied to the observational environment A. In the present embodiment, when a mixed illumination light is examined, by changing a ratio of combining lights, it is possible to change an LUT to be created. Provided that a ratio is made into 5:3:2, it is possible to realize an LUT and an output color data definition to which an actual frequency in use is reflected. A spectroscopy spectrum of an illumination light E in which the illumination lights are mixed with a ratio of 5:3:2 is Pe(λ).

If a spectroscopy spectrum of the illumination light A is Pa (λ), a spectroscopy spectrum of the illumination light B is Pb(λ), and a spectroscopy spectrum of the illumination light C is Pc(λ), a spectroscopy spectrum Pe(λ) of the illumination light E is:

$$Pe(\lambda)=(Pa(\lambda)*5+Pb(\lambda)*3+Pc(\lambda)*2)/(5+3+2).$$

Where symbol "*" denotes a multiplication operator, and "/" denotes a division operator.

It is possible to determine measured color values of the device colors in consideration of weighting by using the spectroscopy spectrum Pe (λ) of the mixed illumination light E obtained in this way. Provided that an output color conversion definition is created on the basis of the determined measured color values, it is possible to obtain an output result in which weighting of the observation environment is reflected.

In the present embodiment, because the step for measuring color is carried out only once before a look-up table is created, and output values are merely calculated on the basis of measured color values which are mixed, it is possible to solve the problems of the number of times of color measurement and the number of processes for calculation which are the problems in the conventional art. Further, in the present embodiment, it is possible to obtain an output result in which weighting of an observation environment according to the order of priority (ordering of priority), which is sampled as the problem in the conventional art, is reflected.

Moreover, in the present embodiment, the method for creating a look-up table on the basis of measured color values of the device color at S903/S904 described above is not limited to a specific technique. Accordingly, the present embodiment can be applied to applications and modules in the conventional art by which it is possible to create a color conversion definition on the basis of measured color values of a device color. That is, it is possible to solve the problem as well that other algorithms without a unique algorithm for creating a color conversion definition cannot be applied to applications and modules by which it is possible to create a color conversion definition on the basis of measured color values of a device color serving as input values, which has been the problem in the conventional art.

[Second Embodiment]

Meanwhile, in a case of a printer, an output result is created by using a plurality of inks or color materials of cyan/magenta/yellow/black, and the like. Because a reflection factor is different for each color material, an extent or a trend of color shift when an illumination light is changed depends on color materials. Therefore, even with the same output result, a magnitude or an extent of a change in appearance differs depending on colors. It can be considered that there are colors that hardly change depending on colors.

Accordingly, it suffices to execute the processing onto only a color gamut in which a color is greatly changed in appearance. The second embodiment can be realized such that measured color values under an mixed illumination light as measured color values in a color gamut in which a color is greatly changed are used in the color gamut, and such that measured color values under a given illumination light are used as measured color values in a color gamut hardly changed, where this illumination light can be estimated as an illumination light in which the illumination lights are mixed with a ratio of 1:0:0. By merely determining measured color values with a mixing ratio being changed, because there is no need to modify the other, it is possible to easily realize it.

A color gamut in which a color is greatly changed can be determined such that measured color values under the respective illumination lights are compared, and a region with a great color difference is defined as it. Or, measured color values under the respective illumination lights are compared for each color material, and it is determined whether a difference in color appearance under a differing illumination light for each color material is great. A color gamut in which a color is greatly changed can be also determined by this means. Additionally, it is possible to determine a color gamut in which a color is greatly changed in accordance with percentages in a blend ratio of a color material with a great difference in color appearance under different illumination lights.

The present embodiment can be realized so as to create a color conversion definition by which a difference in appearance is made smaller with respect to only a color gamut with a great difference in appearance under respective illumination lights in the above-described first embodiment. Further, by utilizing the characteristics of the color materials, it is possible to more effectively create a color conversion definition as described above.

[Third Embodiment]

Figure 11:
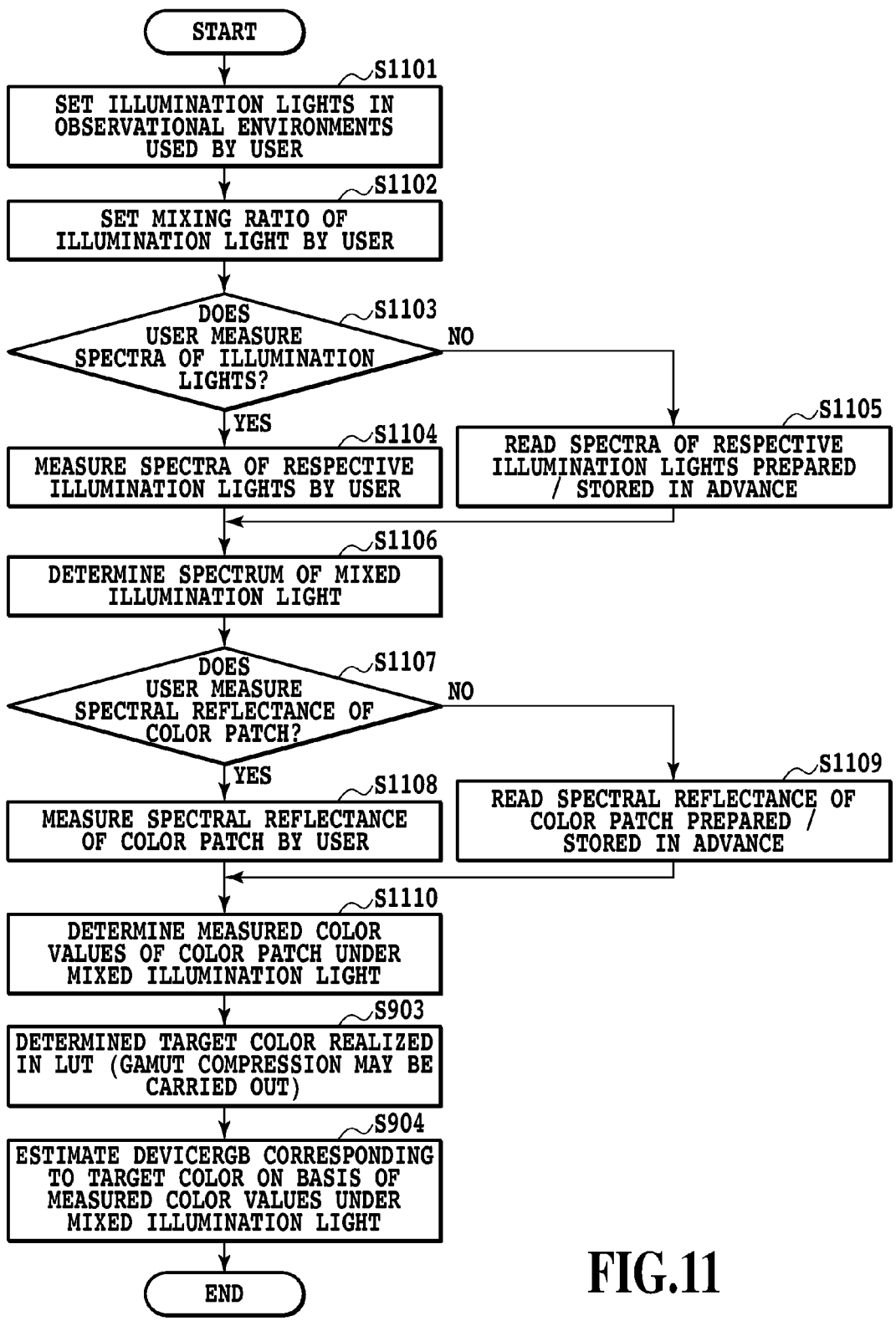
FIG. 11 is a flowchart showing the procedure for creating an output color conversion definition (a LUT) in an environment in which a user actually makes observations according to one embodiment of the present invention.
Figure 12:
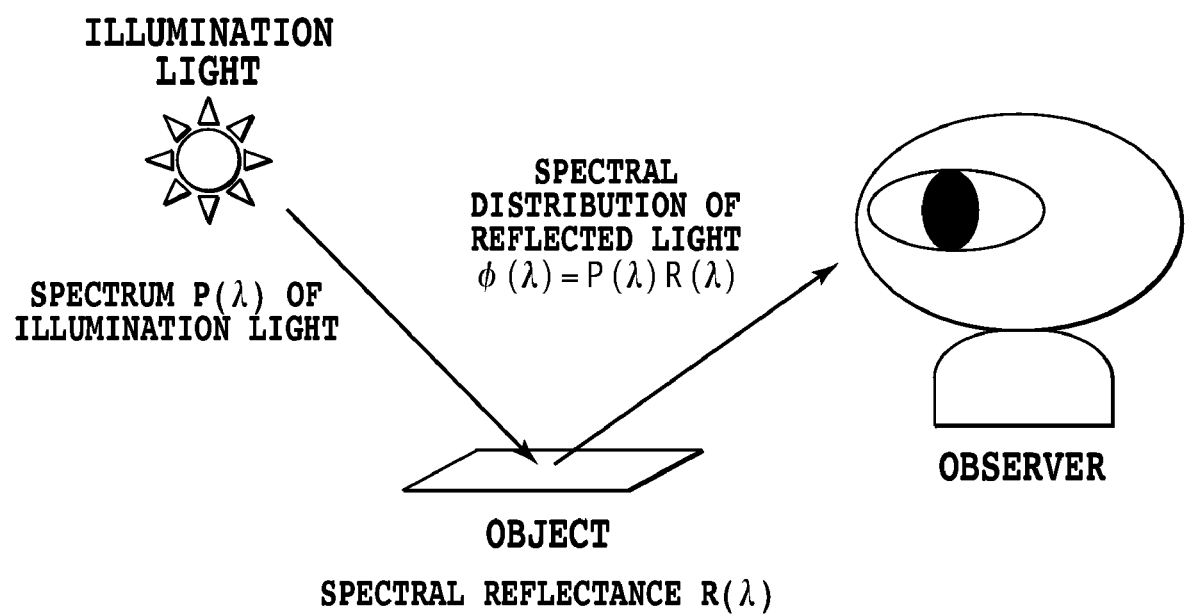
FIG. 12 is a conceptual illustration for explanation of color appearance in human eyes on the basis of color engineering.

As a third embodiment, a method for creating a look-up table (LUT) in accordance with observational environments in which a user actually makes observations, and a method for carrying out an output by an image output device by using the look-up table will be described by use of FIG. 11.

First, at step S1101, the user sets illumination lights in observational environments in which the user actually makes observations.

Next, at step S1102, the user sets a mixing ratio of the respective illumination lights in accordance with a frequency in use or the like. At step S1103, it is selectively inputted whether the user measures spectra of the illumination lights. When the user measures these, at step S1104, the user measures spectra of the respective illumination lights by use of a measuring instrument, and inputs these into the host computer 100 serving as a device for creating a look-up table. When the user does not measure spectra because the user does not have a measuring instrument, at step S1105, spectra of the respective illumination lights prepared and stored in advance by a manufacturer are read.

At step S1106, a spectrum of an illumination light in which the obtained spectra of the respective illumination lights are mixed on the basis of the above-described mixing ratio is determined.

Moreover, at step S1107, it is selectively inputted whether the user measures a spectral reflectance of a color patch. When the user measures it, at step S1108, the user measures a spectral reflectance of the color patch by using a measuring instrument, and inputs it into the host computer 100.

When the user does not measure it because the user does not have a measuring instrument, at step S1109, a spectral reflectance of the color patch prepared and stored in advance by a manufacturer is read. At step S1110, measured color values of the color patch under the mixed illumination light are determined from a spectrum of an illumination light in which the respective illumination lights are mixed on the basis of the obtained spectral reflectance of the color patch and the mixing ratio. Then, at S903/S904, a color conversion definition is determined on the basis of the measured color values. The details are as described in the first embodiment.

In the present embodiment, at S1101, the user determines observational environments in which the user actually makes observations as follows. When an environment varies depending on periods of time such that it is under an illumination light A (sunlight) during daytime hours, and it is under an illumination light B (interior illumination) during nighttime hours, the illumination light A and the illumination light B are set as illumination lights for the observational environment. Further, when an environment varies depending on places for observation such that it is under an illumination light C at a place C, and it is under an illumination light D at a place D, the illumination light C and the illumination light D are set as illumination lights for the observational environment.

Moreover, at steps S1103 to S1110, measured color values of the color patch under the mixed illumination light are determined. Under user's environment, it takes time to actually measure a color of an output result of the image output device under the mixed illumination light after preparing a mixed illumination light. Therefore, the above-described method is adopted. In a case in which the user himself or herself measures a color, it is possible to accurately reflect the spectra of the illumination lights in user's actual observational environment, and a characteristic of an output result of the image output device. However, because a measuring instrument is required, the step at which data prepared in advance is used is included as well.

Further, the spectra of the respective illumination lights measured by the user at S1104 may be once stored, and when the user again creates an output color conversion definition, the user does not measure these again at S1104, but the spectra of the respective illumination lights stored by the user may be read at S1105. In the same way, the spectral reflectance of the color patch measured by the user at S1108 may be once stored, and when the user again creates an output color conversion definition, the user does not measure these again at S1108, but the spectral reflectance of the color patch stored by the user may be read at S1109.

In accordance with the above-described embodiment, it is possible for the user himself or herself to create a color conversion definition by which it is possible to perform optimum output color reproduction in which a difference in appearance of an output result under illumination lights in a plurality of observational environments (an uncomfortable feeling in appearance under the respective illumination lights) is made less, in accordance with observational environments which the user himself or herself uses.

[Fourth Embodiment]

In the third embodiment, the method for creating an LUT in accordance with observational environments in which the user actually makes observations has been described. Here, another embodiment using a spectral reflectance of a color patch, which is not measured by the user, but is stored in advance, will be described.

Generally, as spectra, only a visible light range which can be sensed by a human eye is used. The range is from 380 nm to 780 nm. To express one color at intervals of 1 nm, 401 values are required. Usually, it is possible to manage colors with an accuracy at intervals of 10 nm to 20 nm. However, even in that case, 21 to 41 values are required. Assuming that an output result of an image output device needs 729 colors in order to create a look-up table, in a case in which a spectral reflectance of the image output device is managed by spectra, 729*401 values or 729*41 values are required. Moreover, when a sheet or a print method is changed, data by an amount thereof is required.

If a spectroscopy spectrum of the illumination light A is Pa($\lambda$), a spectroscopy spectrum of the illumination light B is Pb($\lambda$), and a spectroscopy spectrum of the illumination light C is Pc($\lambda$), a spectroscopy spectrum Pd($\lambda$) of the illumination light D in which the three lights are mixed is:

$$Pd(\lambda)=(Pa(\lambda)+Pb(\lambda)+Pc(\lambda))/3.$$

Further, provided that the spectroscopy spectrum Pd($\lambda$) of the mixed illumination light D is multiplied by a spectral reflectance R($\lambda$) of an output patch of the image output device, it is possible to obtain a spectral distribution $\phi$d($\lambda$) of a reflected light as follows.

$$\phi d(\lambda)=Pd(\lambda)R(\lambda)$$

Measured color values of Lab under the mixed illumination light are able to be determined from the spectral distribution $\phi$d($\lambda$) of the reflected light.

Further, it is possible to determine spectral distributions $\phi$a ($\lambda$), $\phi$b ($\lambda$), and $\phi$c ($\lambda$) of reflected lights for the respective illumination lights as follows.

$$\phi a(\lambda)=Pa(\lambda)R(\lambda)$$

$$\phi b(\lambda)=Pb(\lambda)R(\lambda)$$

$$\phi c(\lambda)=Pc(\lambda)R(\lambda)$$

On the basis of these spectral distributions, measured color values (L_A, a_A, b_A) under the illumination light A, measured color values (L_B, a_B, b_B) under the illumination light B, and measured color values (L_C, a_C, b_C) under the illumination light C are determined, and measured color values (L_D, a_D, b_D) under the mixed illumination light D are computed as:

$$L\_D=(L\_A+L\_B+L\_C)/3$$

$$a\_D=(a\_A+a\_B+a\_C)/3$$

$$b\_D=(b\_A+b\_B+b\_C)/3$$

In addition, the measured color values are not necessarily the same as the measured color values determined on the basis of the aforementioned spectral distribution 100 d($\lambda$).

As compared with a case in which an output color conversion definition is created by using the measured color values determined on the basis of the aforementioned spectral distribution $\phi$d($\lambda$), the accuracy is made somewhat lower. However, it is possible to create the similar output color conversion definition. Therefore, not a spectral reflectance of the color patch, but the measured color values of the color patch under the respective illumination lights may be stored in advance, and measured color values under a mixed illumination light may be determined on the basis of the measured color values. If it is possible to manage a color by using Lab values, only three values of L/a/b are sufficient.

On the other hand, when Lab values are prepared in advance, it suffices to store those as measured color values for each illumination light. Therefore, the number thereof is 729*3*the number of illumination lights, which makes it possible to reduce data volume. In this way, measured color values for each illumination light are prepared in advance, and a measured color value is computed on the basis of the Lab values in accordance with a mixed illumination light, thereby, it is possible to further reduce a data volume. Because the measured color values are color-measured and stored in advance, there is no connection to an increase in the number of times of color measurement at the time of creating a color conversion definition, which results in no connection with an increase in the creation time. In accordance with the present embodiment, it is possible for the user himself or herself to reduce the size of data stored at the time of creating a color conversion definition in accordance with observational environments in which the user himself or herself uses. The measured color values have been explained as being of Lab, but the measured color values may be of a color space such as JCh color space of CIECAM02.

[Fifth Embodiment]

As one example of usage of the user, there may be an opportunity in which the user observes an output result under an illumination light other than the illumination lights assumed/determined to create an LUT. Although described in the second embodiment, because a reflection factor for each color material is different, a magnitude or a trend of color shift under a different illumination light is different depending on a color of a print result. There are cases in which there are colors that hardly change depending on colors. When an output result is observed under an illumination light other than the illumination lights assumed/determined to create an LUT, the user feels uncomfortable due to a difference in color of appearance with respect to only a color gamut of a part of the output result.

In such a case, it is necessary to create an LUT by newly adding an illumination light. However, in that case, the user is willing to change the output result with respect to only the color gamut with a great difference in color appearance in consideration of an effect of the illumination light, but is unwilling to change the output result with respect to a color gamut with a slight change. In such a case, by utilizing the second embodiment, provided that a mixed illumination light is determined by newly adding an illumination light to only the color gamut with a great difference in appearance under the illumination light, it is possible to create a color conversion definition by which the difference in appearance can be made less.

[Sixth Embodiment]

In the above-described embodiments 1 to 5, the image output device has been described as an inkjet printer. However, these may be embodiments in which other printers such as a laser printer, a dye sublimation printer, and the like are adopted. Further, the second embodiment has been described such that, because a spectral reflectance is different for each ink, appearance differs for every ink. However, it is a matter of course that it can be applied to color materials other than the inks.

[Seventh Embodiment]

In the above-described embodiments 1 to 6, the series of processings have been described so as to be executed on the host computer 100. However, functions which are the same as those of the host computer 100 may be provided to the printer 105, and the series of processings maybe executed on the scanner 103 or the digital printer 104.

For example, in a case in which the functions which are the same as those of the host computer 100 are provided inside the printer, the image data 201 can be inputted into the printer as follows. That is, the image data 201 can be read via a memory card from a reading device such as a card reader or the like provided to the printer from an image input device such as a digital camera, etc. Or, the image data 201 can be read out of a memory card or a built-in memory which the digital camera has by connecting the digital camera and the printer through wired communication using cables, or through infrared communication or radio communication.

[Eighth Embodiment]

As another embodiment according to the present invention, an embodiment can be taken in which a processing program to make a computer create the aforementioned color conversion definition is supplied. In such a case, provided that a recording medium such as a floppy disk, a hard disk, an optical disk, an optical magnetic disk, a CD-ROM, a CD-R, a magnetic tape, a nonvolatile memory card, or a ROM, is used, and the above-described processing program is stored therein, it is possible to supply the above-described processing program to realize the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-079448, filed Mar. 26, 2007, which is hereby incorporate by reference herein in its entirety.

What is claimed is:

1. A method for creating a color conversion definition which converts an input color in an input color space to an output color in a color space of an image output device, the method comprising the successive steps of:
   (a) using a mixed illumination light of a first illumination light and a second illumination light in an observational environment to observe an output result of the image output device;
   (b) determining color values of a device color of the image output device in the observational environment under the mixed illumination light; and
   (c) creating the color conversion definition on the basis of the determined color values of the device color of the image output device,
   wherein the color conversion definition reduces the difference between the input color and the output color observed under the first illumination light and under the second illumination light compared with the difference between the input color and the output color in a case where the input color is converted to the output color in an observational environment under the second illumination light using a color conversion definition created on the basis of measured color values of a device color of the image output device determined in an observational environment under the first illumination light.

2. The method according to claim 1, wherein, in said using step, a mixing ratio between the first illumination light and the second illumination light is determined in accordance with a priority of an observational environment under the first illumination light and a priority of an observational environment under the second illumination light.

3. The method according to claim 1, wherein, in said determining step, a spectroscopy spectrum of the mixed illumination light is determined on the basis of spectroscopy spectra of the respective illumination lights, and color values of the device color of the image output device are determined on the basis of the spectroscopy spectrum of the mixed illumination light and a spectral reflectance of the device color of the image output device.

4. The method according to claim 1, wherein, in said determining step, color values of the device color of the image output device under the respective illumination lights are once determined, and the color values of the device color of the image output device under the mixed illumination light are reset as color values determined on the basis of the determined color values under the respective illumination lights.

5. A method for creating a color conversion definition which converts an input color in an input color space to an output color in a color space of an image output device, the method comprising the successive steps of:
(a) selectively inputting a first illumination light and a second illumination light;
(b) setting a mixing ratio between the first illumination light and the second illumination light;
(c) using a mixed illumination light of the first illumination light and the second illumination light in an observational environment based on the set mixing ratio;
(d) determining color values of a device color of the image output device in the observational environment under the mixed illumination light; and
(e) creating the color conversion definition on the basis of the determined color values of the device color of the image output device,
wherein the color conversion definition reduces the difference between the input color and the output color observed under the first illumination light and under the second illumination light compared with the difference between the input color and the output color in a case where the input color is converted to the output color in an observational environment under the second illumination light using a color conversion definition created on the basis of measured color values of a device color of the image output device determined in an observational environment under the first illumination light.

6. The method according to claim 5, wherein, in said setting step, a mixing ratio between the first illumination light and the second illumination light is determined for a color gamut.

7. The method according to claim 6, wherein a mixing ratio is determined for a color gamut which has a blend ratio among color materials with great differences in color appearance under the first illumination light and under the second illumination light.

8. The method according to claim 5, wherein, in said setting step, a mixing ratio between the first illumination light and the second illumination light is determined for a color gamut depending on the appearance of the color gamut of the device color under the first illumination light and the second illumination light.

9. An image processing apparatus for creating a color conversion definition which converts an input color in an input color space to an output color in a color space of an image output device, comprising:
a lighting unit which uses a mixed illumination light of the first illumination light and the second illumination light in an observational environment to observe an output result of the image output device;
a determining unit which determines color values of a device color of the image output device in the observational environment under the mixed illumination light; and
a color conversion definition creating unit which creates a color conversion definition on the basis of the determined color values of the device color of the image output device,
wherein the color conversion definition reduces the difference between the input color and the output color observed under the first illumination light and under the second illumination light compared with the difference between the input color and the output color in a case where the input color is converted to the output color in an observational environment under the second illumination light using a color conversion definition created on the basis of measured color values of a device color of the image output device determined in an observational environment under the first illumination light.

10. The image processing apparatus according to claim 9, wherein said lighting unit determines a mixing ratio between the first illumination light and the second illumination light in accordance with a priority of an observational environment under the first illumination light and a priority of an observational environment under the second illumination light.

11. The image processing apparatus according to claim 9, wherein said determining unit determines a spectroscopy spectrum of the mixed illumination light on the basis of spectroscopy spectra of the respective illumination lights, and determines color values of the device color of the image output device on the basis of the spectroscopy spectrum of the mixed illumination light and a spectral reflectance of the device color of the image output device.

12. The image processing apparatus according to claim 9, wherein said determining unit once determines color values of the device color of the image output device under the respective illumination lights, and resets the color values of the device color of the image output device under the mixed illumination light as color values determined on the basis of the determined color values under the respective illumination lights.

13. The image processing apparatus according to claim 9, wherein said lighting unit determines a mixing ratio for each color gamut depending on the appearance of each color gamut of the device color under the first illumination light and the second illumination light.

14. The image processing apparatus according to claim 9, wherein the color conversion definition is composed of a color look-up table, matrix coefficients and γ values, or formulas.

15. An image processing apparatus for creating a color conversion definition which converts an input color in an input color space to an output color in a color space of an image output device, the image processing apparatus comprising:
an input unit which selectively inputs the first illumination light and the second illumination light;
a setting unit which sets a mixing ratio between the first illumination light and the second illumination light;
a lighting unit which uses a mixed illumination light of the first illumination light and the second illumination light in an observational environment based on the set mixing ratio;
a determining unit which determines color values of a device color of the image output device in the observational environment under the mixed illumination light; and
a color conversion definition creating unit which creates the color conversion definition on the basis of the determined color values of the device color of the image output device,
wherein the color conversion definition reduces the difference between the input color and the output color observed under the first illumination light and under the second illumination light compared with the difference between the input color and the output color in a case where the input color is converted to the output color in an observational environment under the second illumination light using a color conversion definition created on the basis of measured color values of a device color of the image output device determined in an observational environment under the first illumination light.

16. The image processing apparatus according to claim 15, wherein said setting unit determines a mixing ratio between the first illumination light and the second illumination light for a color gamut.

17. The image processing apparatus according to claim 16, wherein said setting unit determines the mixing ratio for a color gamut which has a blend ratio among color materials with great differences in color appearance under the first illumination light and under the second illumination light.

18. The image processing apparatus according to claim 15, wherein said setting unit determines a mixing ratio between the first illumination light and the second illumination light for a color gamut depending on an appearance of the color gamut of the device color under the first illumination light and the second illumination light.

19. The image processing apparatus according to claim 18, wherein said color conversion definition creating unit creates a color gamut only for a color gamut with a great difference in color appearance under the first illumination light and under the second illumination light.

* * * * *